(12) United States Patent
Tsao

(10) Patent No.: US 10,928,648 B2
(45) Date of Patent: Feb. 23, 2021

(54) NOSE PAD STRUCTURE AND HEAD-MOUNTED DEVICE USING THE SAME

(71) Applicant: Acer Incorporated, New Taipei (TW)

(72) Inventor: Jung-Wei Tsao, New Taipei (TW)

(73) Assignee: Acer Incorporated, New Taipei (TW)

( * ) Notice: Subject to any disclaimer, the term of this patent is extended or adjusted under 35 U.S.C. 154(b) by 189 days.

(21) Appl. No.: 16/286,610

(22) Filed: Feb. 27, 2019

(65) Prior Publication Data
US 2020/0064653 A1 Feb. 27, 2020

Related U.S. Application Data

(60) Provisional application No. 62/723,477, filed on Aug. 27, 2018.

(30) Foreign Application Priority Data

Dec. 5, 2018 (TW) .............................. 107143777 A

(51) Int. Cl.
*G02C 5/12* (2006.01)
*G06F 1/16* (2006.01)
(52) U.S. Cl.
CPC ............. *G02C 5/126* (2013.01); *G06F 1/163* (2013.01)

(58) Field of Classification Search
CPC ..................................................... G02C 5/126
See application file for complete search history.

(56) References Cited

U.S. PATENT DOCUMENTS 6,480,174 B1 11/2002 Kaufmann et al.
2018/0059434 A1* 3/2018 Heisey .................... G06F 1/163

FOREIGN PATENT DOCUMENTS

| CN | 206301078 | 7/2017 |
|---|---|---|
| CN | 206725849 | 12/2017 |
| JP | 5030595 | 9/2012 |
| WO | 2015079610 | 6/2015 |

* cited by examiner

*Primary Examiner* — James C. Jones
(74) *Attorney, Agent, or Firm* — JCIPRNET

(57) ABSTRACT

A nose pad structure suited for a head-mounted device is provided. The nose pad structure includes a first nose pad and a second nose pad. The first nose pad has a first fixing portion assembled to the head-mounted device and a first free portion. The second nose pad has a second fixing portion assembled to the head-mounted device and a second free portion being movably overlapped with the first free portion. When a user wears the head-mounted device, the first and the second nose pads cover and contact the user's nose, and an overlapping status of the first and the second free portions is adjusted according to the user's nose shape.

17 Claims, 9 Drawing Sheets

NOSE PAD STRUCTURE AND HEAD-MOUNTED DEVICE USING THE SAME

CROSS-REFERENCE TO RELATED APPLICATION

This application claims the priority benefits of U.S. provisional application Ser. No. 62/723,477, filed on Aug. 27, 2018 and Taiwan application serial no. 107143777, filed on Dec. 5, 2018. The entirety of each of the above-mentioned patent applications is hereby incorporated by reference herein.

BACKGROUND

Technical Field

The disclosure relates to a nose pad structure, and more particularly to a nose pad structure of a head-mounted device.

Description of Related Art

With the development of display devices, the size and weight of display devices are developed toward miniaturization. In recent years, wearable devices have become a popular research and development mainstream in the electronics industry, and their application products have covered headphones, bracelets, glasses, and even hats and socks. Some products can bring great convenience to human life, and some products are used to improve the accuracy of experiments or measurement results, and some products are used to enhance entertainment.

Among these products, in terms of head-mounted displays, the most common application products are those that allow a user to see special visual effects such as systems of virtual reality (VR), augmented reality (AR) or mixed reality (MR) when the user wears them and thus can meet a variety of use needs.

A head-mounted device, such as a head-mounted display (HMD), is an optical product for visual display, which places a display module in front of the user's eyes and projects an image output by the display module onto the user's retina through an optical component to produce a planar or stereoscopic and large size image through an image re-combination by the optic nerves of the human brain.

In general, the head-mounted device is worn on the user's head in a way that provides overall coverage. However, the user's face and nose contours vary from person to person, which does not allow a single product to fit properly on everyone's face. Therefore, how to improve the user's comfort level in wearing the head-mounted device becomes a problem that persons skilled in the art needs to consider and solve.

SUMMARY

The disclosure provides a nose pad structure and a head-mounted device using the same, which can be adapted to users with different nose shapes by a movable nose pad structure.

The nose pad structure of the disclosure is suited for a head-mounted device. The nose pad structure includes a first nose pad and a second nose pad. The first nose pad has a first fixing portion assembled to the head-mounted device and a first free portion. The second nose pad has a second fixing portion assembled to the head-mounted device and a second free portion being movably overlapped with the first free portion. When a user wears the head-mounted device, the first and the second nose pads cover and contact the user's nose, and an overlapping status of the first and the second free portions is adjusted according to the user's nose shape.

The head-mounted device of the disclosure includes a body and a nose pad structure. The body has a display screen and a nose support portion, wherein the nose support portion is located below a center of the display screen. The body further has an end edge extending from an outside of the display screen away from the display screen, and a step exists between the end edge and the nose support portion. The nose pad structure is assembled to the body and fills the step. When a user wears the head-mounted device, the nose pad structure abuts between the user's nose and the nose support portion.

Based on the above, in the head-mounted device, the nose pad structure includes the first nose pad and the second nose pad, each of which is assembled to the body of the head-mounted device by the fixing portion and has the free portion for being movably overlapped with each other to form a petal structure. Therefore, when the user wears the head-mounted device, the free portions of the first nose pad and the second nose pad can change their overlapping status according to the user's nose shape. In this way, even if users with different face contours and nose shapes wear the same head-mounted device, the nose pad structure can be adapted to different users accordingly, thereby offering the users a comfortable use state.

In order to make the aforementioned features and advantages of the disclosure comprehensible, embodiments accompanied with drawings are described in detail below.

DESCRIPTION OF THE EMBODIMENTS

Figure 1:
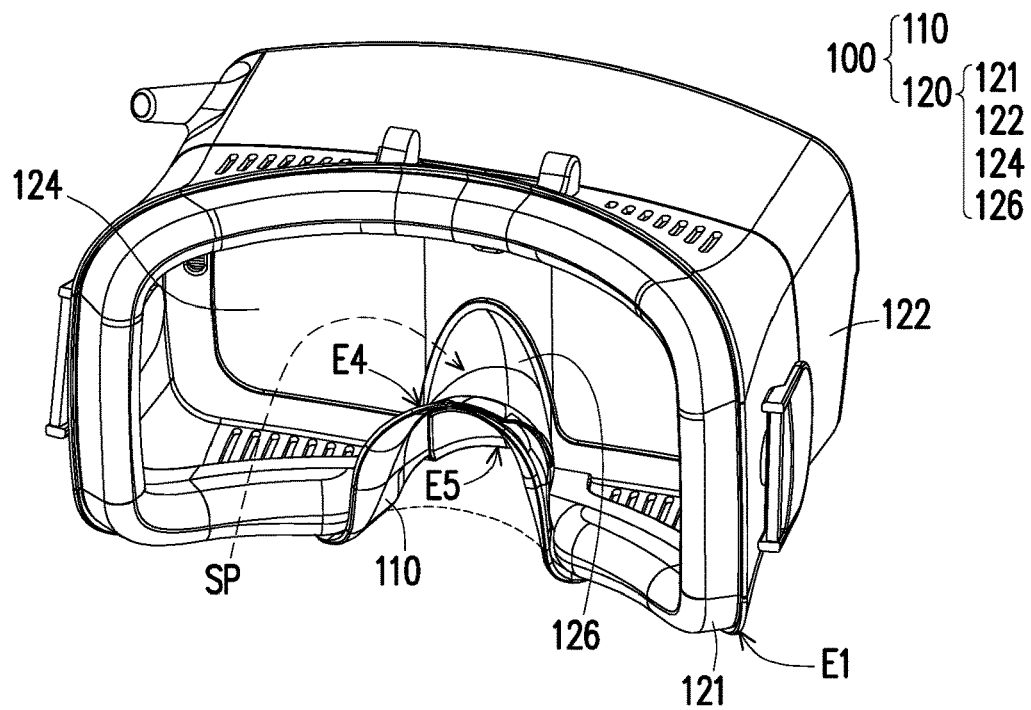
FIG. 1 is a schematic diagram of a head-mounted device according to an embodiment of the disclosure.

FIG. 1 is a schematic diagram of a head-mounted device according to an embodiment of the disclosure. With reference to FIG. 1, in the embodiment, a head-mounted device 100 includes a nose pad structure 110 and a body 120, wherein the body 120 includes a housing 122, a face support portion 121, and a display screen 124 and a nose support portion 126 disposed in the housing 122. The nose support portion 126 is located below a center of the display screen 124, and the housing 122 covers an outside of the display screen 124 and extends in a direction away from the display screen 124 to form an end edge E1. The face support portion 121 is made of, for example, a cushioning material such as foam or rubber and is disposed on the end edge E1. The nose pad structure 110 is assembled to the body 120, is located between the nose support portion 126 and the end edge E1 and is also attached to the face support portion 121. When a user wears the head-mounted device 100, the user's face abuts against the face support portion 121, and the nose pad structure 110 abuts between the nose support portion 126 and the user's nose to offer the user a comfortable user experience through the nose pad structure 110 and the face support portion 121.

Figure 2A:
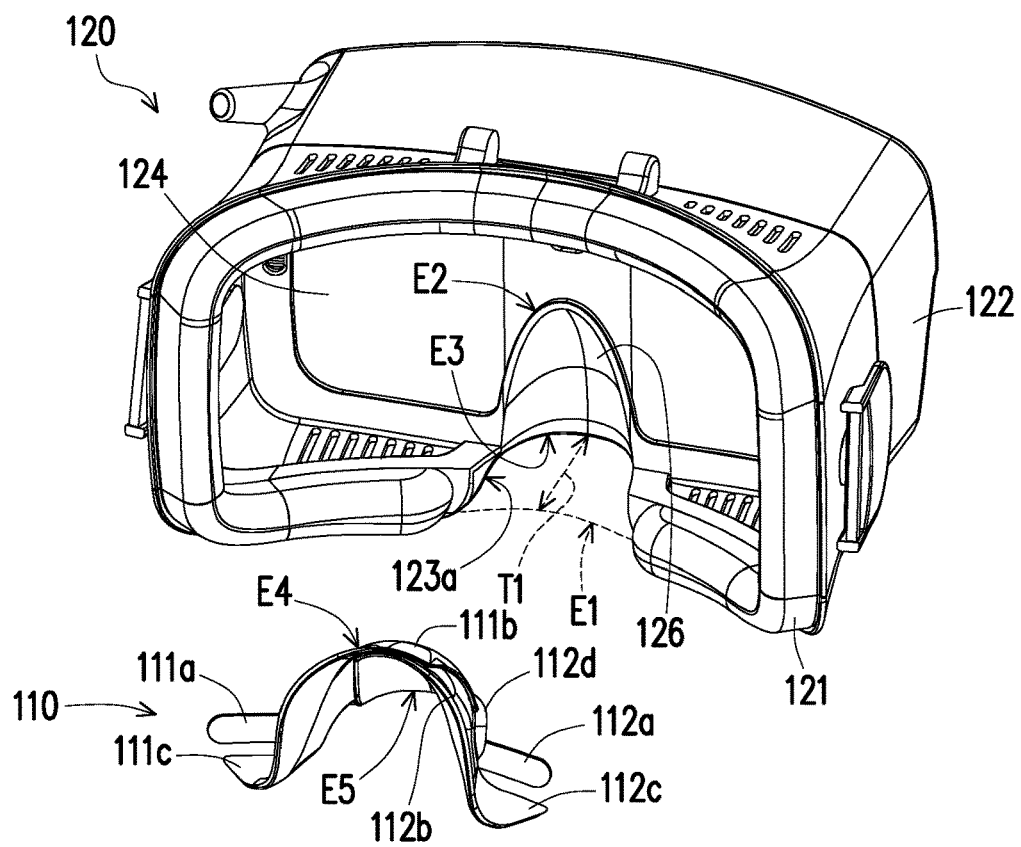
FIGS. 2A to 2C are exploded diagrams of the head-mounted device of FIG. 1 at different viewing angles.
Figure 2B:
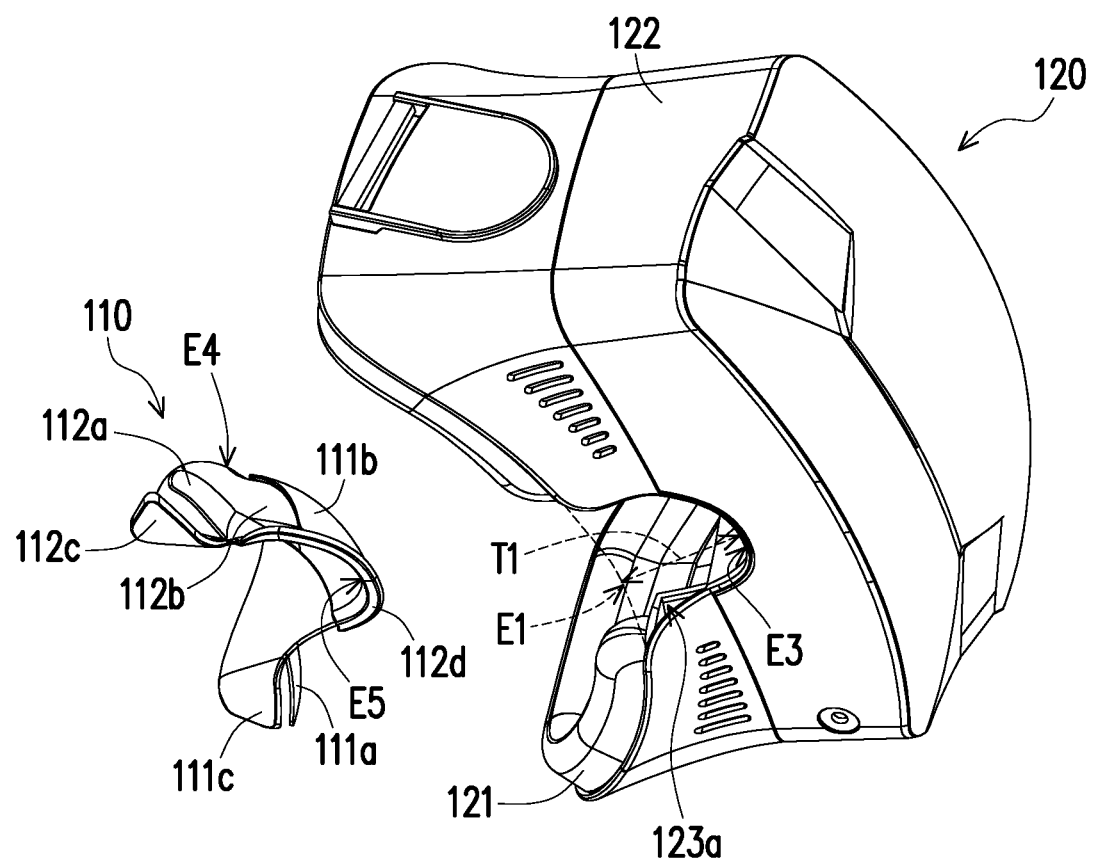
Figure 2C:
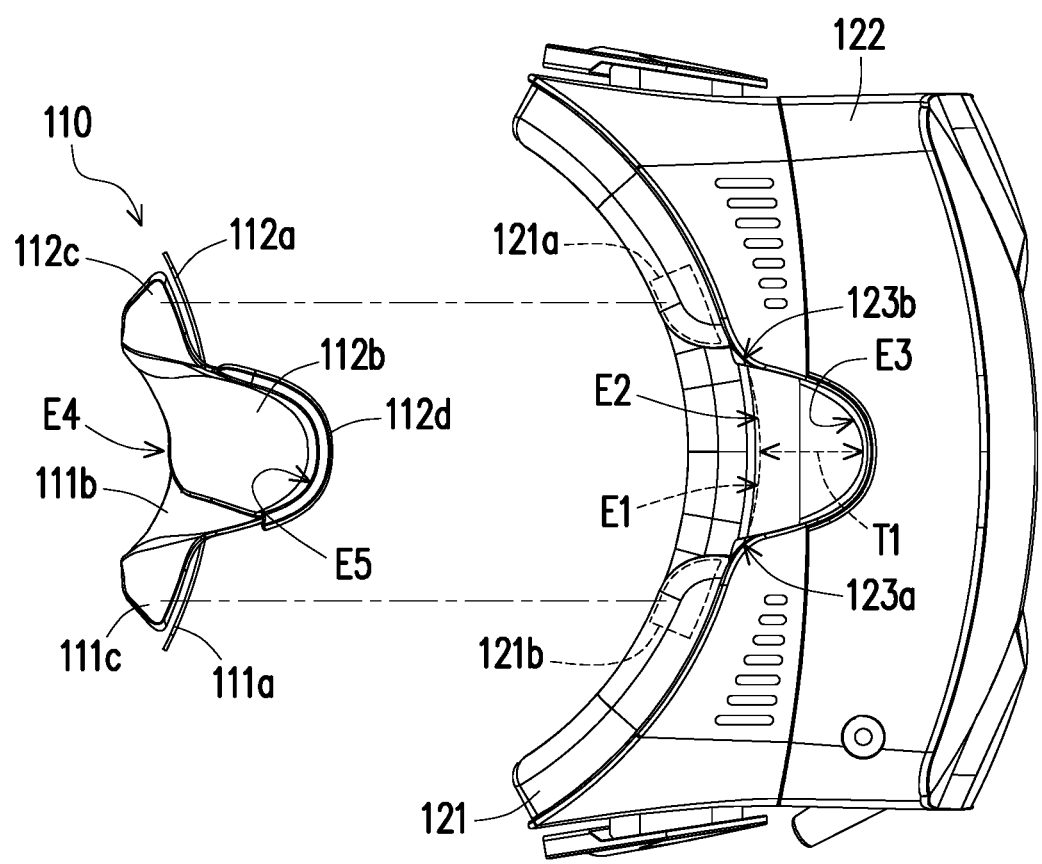

FIGS. 2A to 2C are exploded diagrams of the head-mounted device of FIG. 1 at different viewing angles. With reference to FIGS. 2A to 2C together, the end edge E1 of the body 120 and the face support portion 121 located on the end edge E1 are in fact in a non-continuous contour for the user's face, and the nose pad structure 110 connects the non-continuous contour. Further, for the body 120, there is a step T1 existing between the end edge E1 and the nose support portion 126, and the end edge E1 shown in FIG. 2A is extended along the physical contour of the body 120 so as to serve as a reference for the step T1. At the same time, the direction of the step T1 is consistent with the orientation of the user's face, and therefore, the nose pad structure 110 becomes a structure for filling the step T1.

Figure 3:
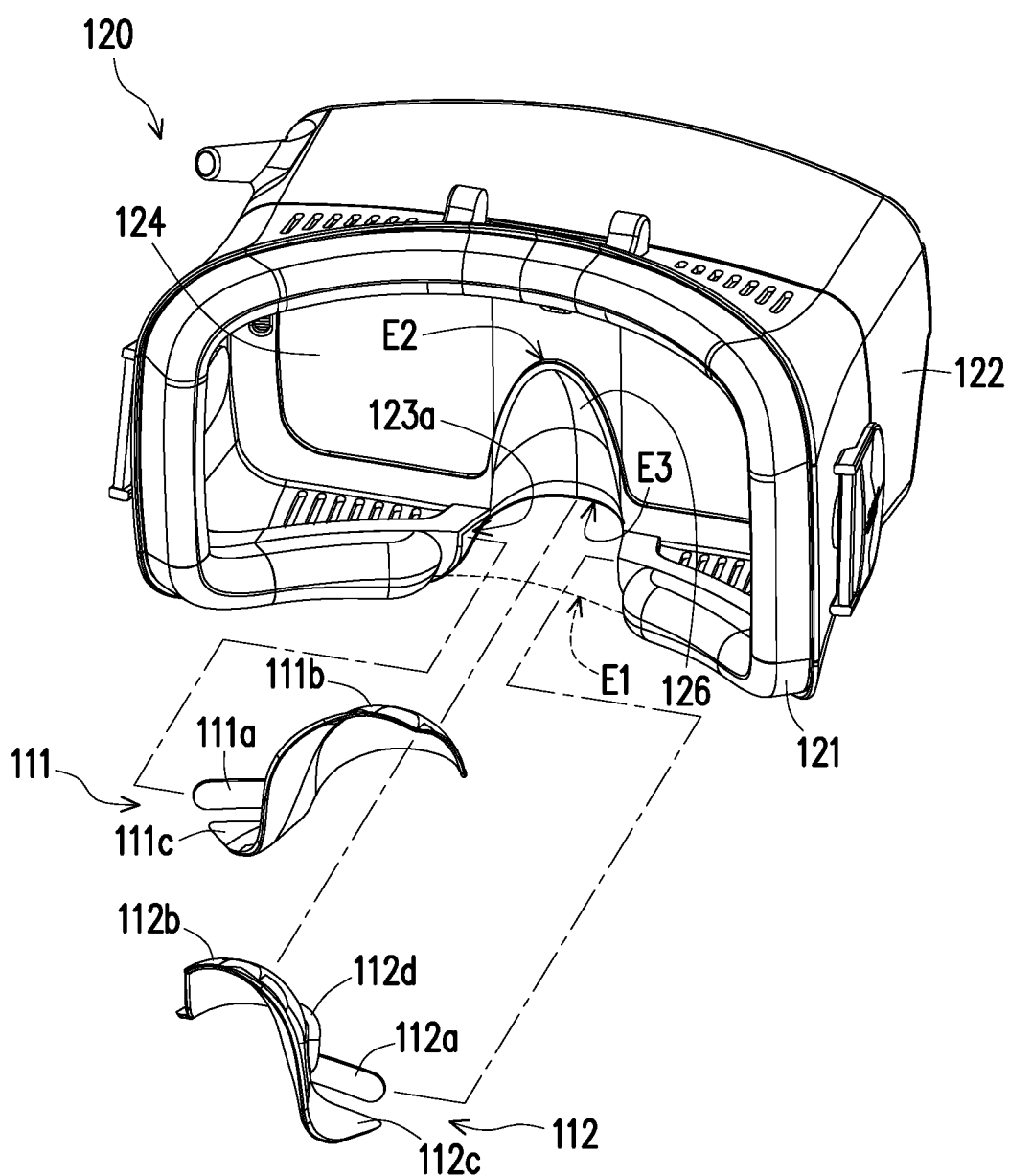
FIG. 3 is another exploded diagram of the head-mounted device.

FIG. 3 is another exploded diagram of the head-mounted device and further disassembles the nose pad structure 110. With reference to FIGS. 2A and 3 together, in the embodiment, the nose pad structure 110 includes a first nose pad 111 and a second nose pad 112, wherein the first nose pad 111 has a first fixing portion 111a, a first free portion 111b and a first wing portion 111c, and the second nose pad 112 has a second fixing portion 112a, a second free portion 112b and a second wing portion 112c. With reference to FIGS. 2A and 3 together, it is clear that the first fixing portion 111a and the second fixing portion 112a are respectively assembled to the end edge E1 of the housing 122 and that the first free portion 111b and the second free portion 112b are movably overlapped with each other so that the first free portion 111b and the second free portion 112b can form a petal structure. When the user wears the head-mounted device 100 and causes the nose to abut against the nose pad structure 110, the movable first free portion 111b and second free portion 112b can be driven by the user's nose to produce relative displacement and deformation so that the nose pad structure 110 can be adapted to the user's nose shape.

In detail, with reference to FIGS. 2C and 3, in the embodiment, the head-mounted device 100 further has a pair of gaps 123a and 123b located between the nose support portion 126 and the end edge E1, and the first fixing portion 111a and the second fixing portion 112a extend into the gaps 123a and 123b, respectively, and are assembled to the body 120 of the head-mounted device 100, so that a part of the first free portion 111b closes the gap 123a, and a part of the second free portion 112b closes the gap 123b. Furthermore, after the nose pad structure 110 is assembled to the body 120, the aforementioned first wing portion 111c and second wing portion 112c are respectively attached to lower surfaces 121a and 121b of the face support portion 121, which not only can improve the assembly strength of the nose pad structure 110 and the body 120 but also can provide a shielding effect for the gaps at the face support portion 121, i.e., to prevent light from the external environment from entering the housing 122 through the lower surfaces 121a and 121b of the face support portion 121.

The cause of the above case is that although the face support portion 121 is made of a cushioning material and has flexibility, since the surface contour around the nose on the user's face is not as smooth as that around the forehead, gaps are likely to occur, and thus light from the external environment is likely to enter the housing 122 from these gaps, thereby affecting the visual effect when the user views the display screen 124. Accordingly, since the first wing portion 111c and the second wing portion 112c attached to the lower surfaces 121a and 121b can rest on the user's nose wings when the user wears the head-mounted device 100 (i.e., the first wing portion 111c and the second wing portion 112c abut between the user's nose wings and the lower surfaces 121a and 121b of the face support portion 121), a further light-shielding effect can thus be provided for the gaps at these places.

As shown in FIG. 1, in the embodiment, for the nose pad structure 110, the assembled first nose pad 111 and second nose pad 112 form a common upper edge E4 and a common lower edge E5 to correspond to an upper edge E2 and a lower edge E3 of the nose support portion 126, wherein the lower edge E5 of the nose pad structure 110 is assembled to and abuts in contact with the lower edge E3 of the nose support portion 126, and there is a space SP existing between the upper edge E4 of the nose pad structure 110 and the upper edge E2 of the nose support portion 126. Accordingly, the space SP can be a space for accommodating the displacement and deformation of the first free portion 111b and the second free portion 112b.

In the embodiment, the second nose pad 112 further has a skirt portion 112d located on the lower edge E5 for providing a further light-shielding effect when it abuts in contact with the lower edge E3 of the nose support portion 126 to prevent light from the external environment from entering the housing 122 through a gap that may occur between the lower edge E3 of the nose support portion 126 and the lower edge E5 of the nose pad structure 110.

Figure 4A:
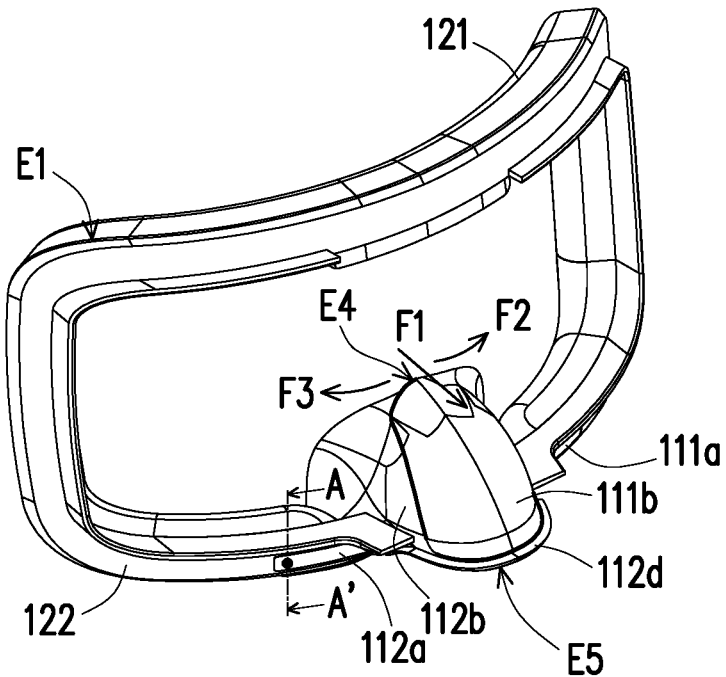
FIG. 4A is a schematic diagram of part of the components of the head-mounted device.
Figure 4B:
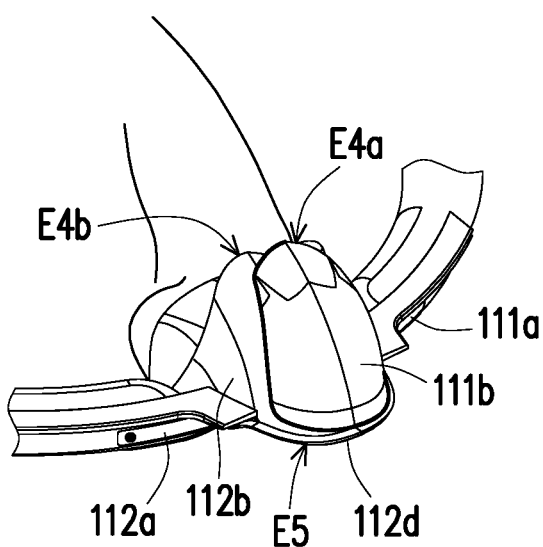
FIG. 4B is a schematic diagram of the nose pad structure of FIG. 4A in another state.
Figure 4C:
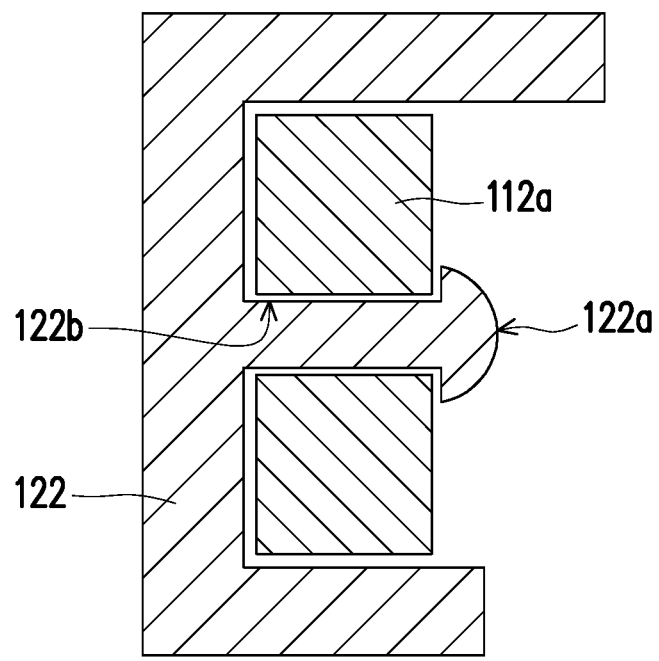
FIG. 4C is a cross-sectional diagram of the head-mounted device of FIG. 4A taken along the section line A-A'.

FIG. 4A is a schematic diagram of part of the components of the head-mounted device. FIG. 4B is a schematic diagram of the nose pad structure of FIG. 4A in another state. FIG. 4C is a cross-sectional diagram of the head-mounted device of FIG. 4A taken along the section line A-A', wherein FIG. 4A shows the nose pad structure 110 in the initial state, and FIG. 4B shows the nose pad structure 110 in a state of displacement and deformation caused by the user's nose bridge when the user wears the head-mounted device 100. With reference to FIGS. 4A and 4B first, as described above, since the first free portion 111b and the second free portion 112b are movably overlapped with each other, when the user's nose abuts against the nose pad structure 110, the overlapping status of the first free portion 111b and the second free portion 112b can be adjusted correspondingly according to the user's nose shape. Comparing FIG. 4A with FIG. 4B, one can see that since the first fixing portion 111a and the second fixing portion 112a of the nose pad structure 110 are adjacent to the lower edge E5 of the nose pad structure 110 and are respectively fixed on two opposite sides of the housing 122, the first nose pad 111 and the second nose pad 112 in the petal structure exhibit a blooming process when driven by the nose bridge. As shown in FIG. 4A, when driven by forces F1, F2, and F3, the upper edge E4 of the nose pad structure 110 is accordingly further divided into an upper edge E4a of the first free portion 111b and an upper edge E4b of the second free portion 112b. At the same time, the relative displacement and deformation of the first nose pad 111 and the second nose pad 112 produced during the blooming process occur in the space SP.

With reference to FIGS. 4A and 4C again, a fixing method is provided to describe the relationship of the assembly of the first fixing portion 111a and the second fixing portion 112b to the housing 122. Since the nose pad structure 110 is made of a rubber material, it has considerable flexibility and elasticity. Accordingly, the housing 122 of the embodiment further has a buckle protrusion 122a, and the second fixing portion 112a has a buckle hole 122b. The assembly between the second fixing portion 112a and the housing 122 is completed by reeving the buckle protrusion 122a through the buckle hole 122b and buckling the buckle protrusion 122a to the buckle hole 122b. Of course, the first fixing portion 111a and the housing 122 may also be assembled with the same structure. In addition, any fixing method can be applied to the disclosure as long as it can fixedly assemble the first fixing portion 111a and the second fixing portion 112a to the housing 122.

Figure 5A:
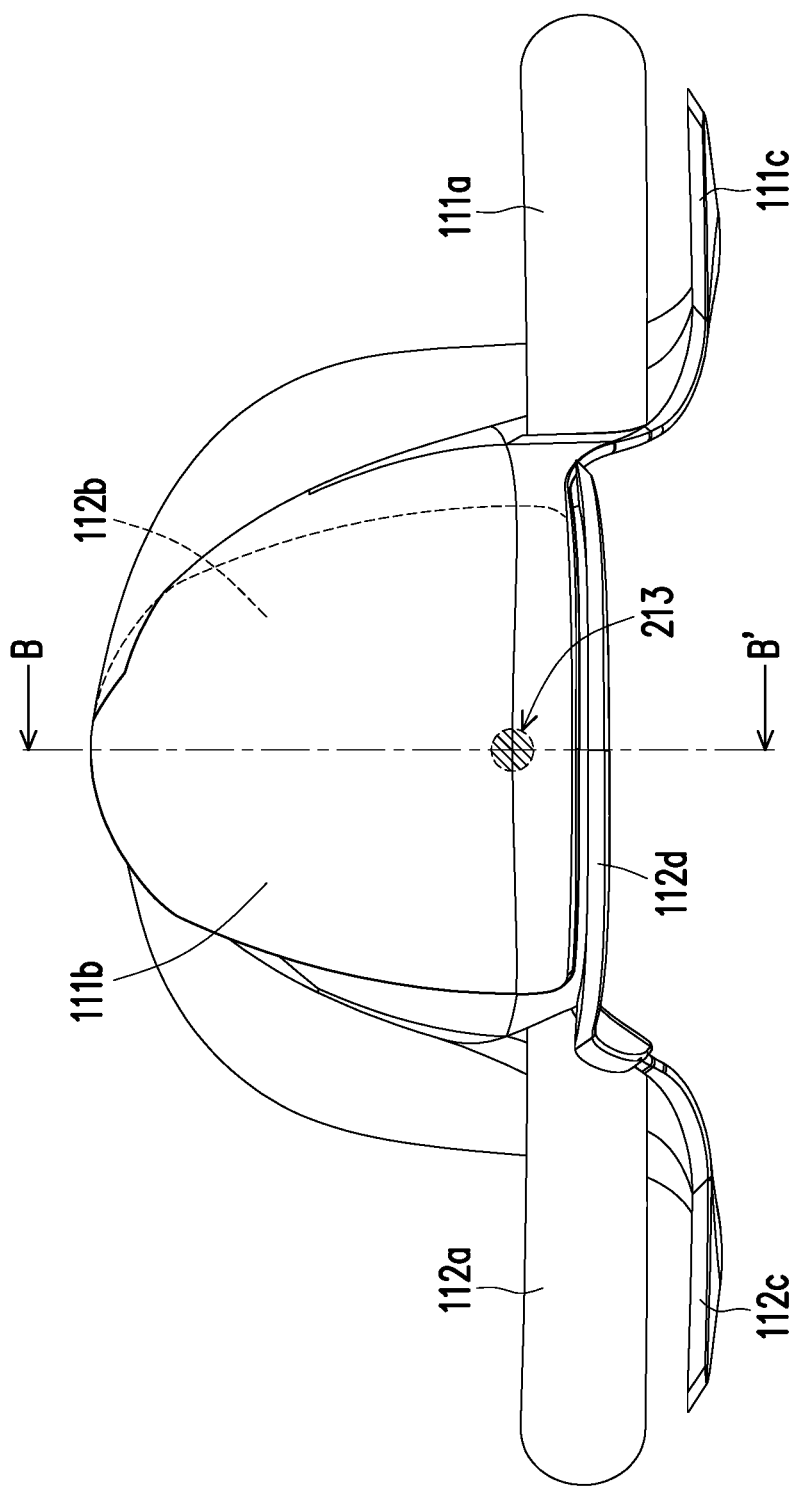
FIG. 5A is a schematic diagram of a nose pad structure according to another embodiment of the disclosure.
Figure 5B:
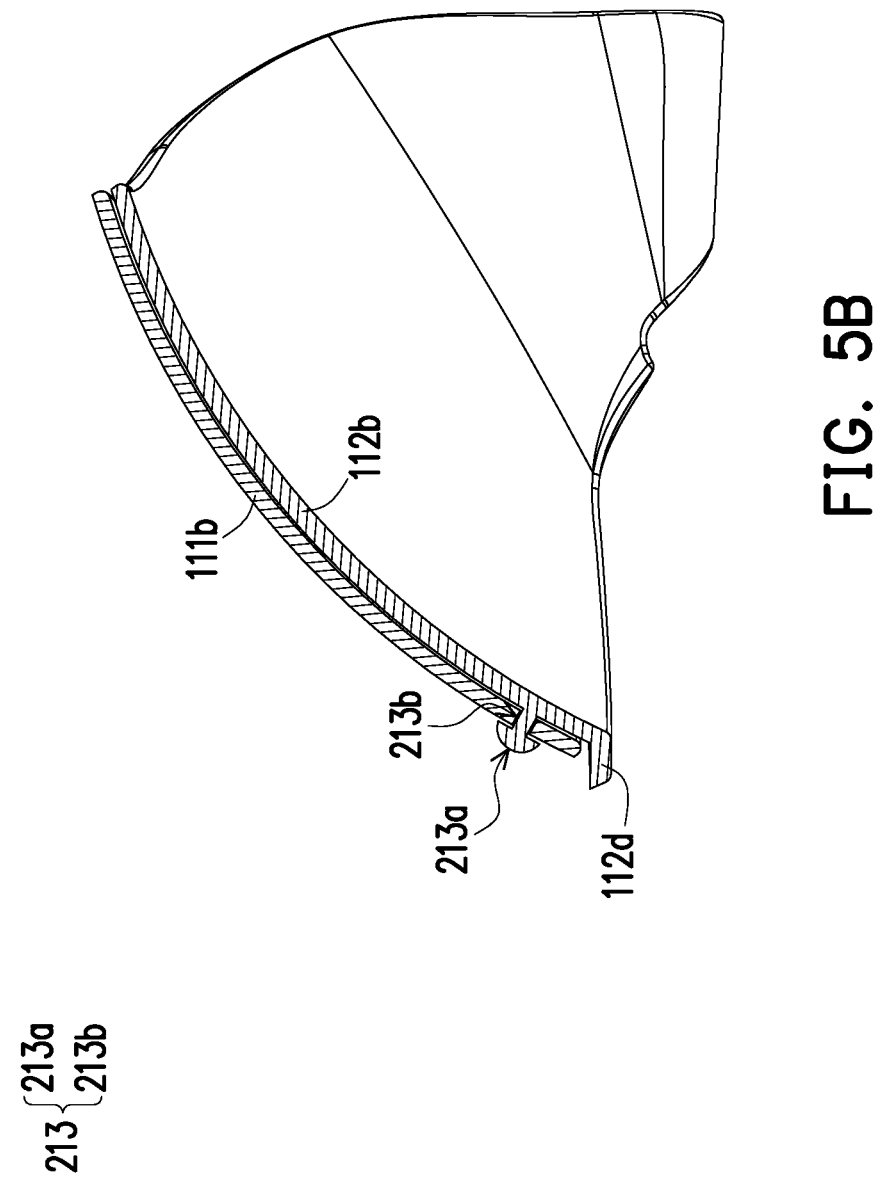
FIG. 5B is a cross-sectional diagram of the nose pad structure of FIG. 5A taken along the section line B-B'.
Figure 5C:
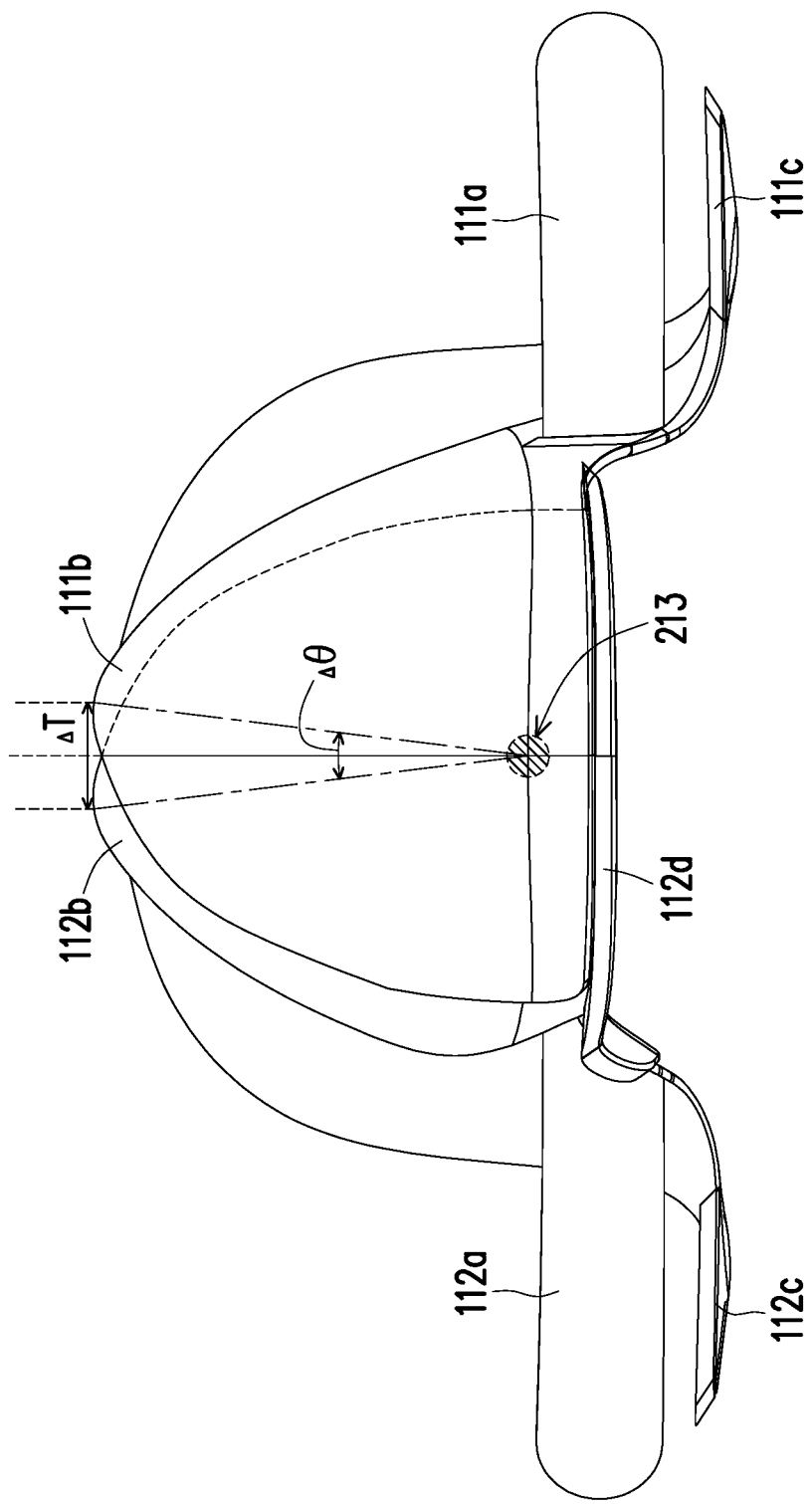
FIG. 5C is a schematic diagram of the nose pad structure of FIG. 5A in another state.

FIG. 5A is a schematic diagram of a nose pad structure according to another embodiment of the disclosure. FIG. 5B is a cross-sectional diagram of the nose pad structure of FIG. 5A taken along the section line B-B'. FIG. 5C is a schematic diagram of the nose pad structure of FIG. 5A in another state. With reference to FIGS. 5A to 5C together, in the embodiment, a nose pad structure 210 is substantially the same as the nose pad structure 110 shown in the previous embodiment and is also suited for the head-mounted device 100. The difference between the two lies in that the nose pad structure 210 further includes a pivot portion 213 for connecting the first free portion 111b and the second free portion 112b. Here, the pivot portion 213 is formed by a buckle hole 213b in the first free portion 111b and a buckle protrusion 213a on the second free portion 112b, similar to the above-described buckle protrusion 122a and buckle hole 122b and also not limited thereto. When the first free portion 111b and the second free portion 112b are assembled through the pivot portion 213, the pivot portion 213 serves as their pivot center.

Accordingly, when the user wears the head-mounted device 100 and causes the nose to drive the nose pad structure 210, the user's nose contacts and drives the first free portion 111b and the second free portion 112b to rotate with the pivot portion 213 as a center so as to adjust the overlapping status of the first free portion 111b and the second free portion 112b. Here, since the pivot portion 213 is adjacent to a lower edge of the first free portion 111b and a lower edge of the second free portion 112b, an upper edge of the first free portion 111b and an upper edge of the second free portion 112b rotate and displace relative to the pivot portion 213 when the overlapping status is adjusted, wherein a relative rotation angle is Δθ and a relative displacement caused by the relative rotation angle is ΔT. Here, the pivot portion 213 provides a limiting structure which allows the nose pad structure 210 to smoothly perform relative movement so that the friction between the nose pads is prevented from being excessively large and causing difficulty in performing the blooming process.

In summary, in the above embodiments of the disclosure, the nose pad structure of the head-mounted device includes the first nose pad and the second nose pad, each of which is assembled to the body of the head-mounted device by the fixing portion and has the free portion for being movably overlapped with each other to form the petal structure. Therefore, when the user wears the head-mounted device, the free portions of the first nose pad and the second nose pad can change their overlapping status according to the user's nose shape; that is, the free portions are driven by the user's nose so that the nose pad structure performs the blooming process. In addition, the space existing between the upper edge of the nose pad structure and the upper edge of the nose support portion of the body is for accommodating the relative displacement and deformation produced during the blooming process so that the process can be performed smoothly.

Furthermore, in another embodiment, the nose pad structure further achieves the effect of the smooth pivot of the free portions by the pivot portion connecting the free portions, so that the blooming process can also be performed smoothly.

In this way, even if users with different face contours and nose shapes wear the same head-mounted device, the nose pad structure can be adapted to different users accordingly, thereby offering the users a comfortable use state.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A nose pad structure adapted for a head-mounted device, the nose pad structure comprising:
    a first nose pad having a first fixing portion and a first free portion, the first fixing portion is assembled to the head-mounted device; and
    a second nose pad having a second fixing portion and a second free portion, the second fixing portion is assembled to the head-mounted device, and the second free portion being movably overlapped with the first free portion, wherein when a user wears the head-mounted device, the first nose pad and the second nose pad cover and contact the user's nose, and an overlapping status of the first free portion and the second free portion is adjusted according to the user's nose shape.

2. The nose pad structure of the head-mounted device according to claim 1, wherein the head-mounted device has a nose support portion and a face support portion, and when the user wears the head-mounted device, the user's face abuts against the face support portion, and the first free portion and the second free portion abut between the nose support portion and the user's nose.

3. The nose pad structure of the head-mounted device according to claim 2, wherein a lower edge of the first free portion or a lower edge of the second free portion abuts in contact with a lower edge of the nose support portion.

4. The nose pad structure of the head-mounted device according to claim 2, wherein an upper edge of the nose support portion maintains a space relative to the first free portion and the second free portion, and when the user wears the head-mounted device, the user's nose drives the first free portion and the second free portion to produce displacement and deformation when the overlapping status is adjusted, and the space accommodates the displacement and deformation.

5. The nose pad structure of the head-mounted device according to claim 2, wherein the head-mounted device further has a pair of gaps located between the nose support portion and the face support portion, and the first fixing portion and the second fixing portion extend into the pair of gaps, respectively, and are assembled to the head-mounted device, so that a part of the first free portion and a part of the second free portion close the pair of gaps.

6. The nose pad structure of the head-mounted device according to claim 2, further comprising:

a first wing portion extending from the first free portion; and a second wing portion extending from the second free portion, wherein the first wing portion and the second wing portion are respectively disposed on lower surfaces of the face support portion to be abutted between the user's nose wings and the face support portion.

7. The nose pad structure of the head-mounted device according to claim 1, further comprising:

a pivot portion for connecting the first free portion and the second free portion, wherein the user's nose contacts and drives the first free portion and the second free portion to rotate with the pivot portion as a center so as to adjust the overlapping status of the first free portion and the second free portion.

8. The nose pad structure of the head-mounted device according to claim 7, wherein the pivot portion is adjacent to a lower edge of the first free portion and a lower edge of the second free portion, so that an upper edge of the first free portion and an upper edge of the second free portion rotate and displace relative to the pivot portion when the overlapping status is adjusted.

9. A head-mounted device, comprising:

a body having a display screen and a nose support portion, wherein the nose support portion is located below a center of the display screen, the body further has an end edge extending from an outside of the display screen away from the display screen, and a step exists between the end edge and the nose support portion; and a nose pad structure assembled to the body and filling the step, wherein when a user wears the head-mounted device, the nose pad structure abuts between the user's nose and the nose support portion.

10. The head-mounted device according to claim 9, wherein the nose pad structure comprises:

a first nose pad having a first fixing portion and a first free portion, the first free portion is assembled to the body; and a second nose pad having a second fixing portion and a second free portion, the second fixing portion is assembled to the body, and the second free portion being movably overlapped with the first free portion, wherein when the user's nose abuts against the nose pad structure, an overlapping status of the first free portion and the second free portion is adjusted according to the user's nose shape.

11. The head-mounted device according to claim 10, wherein a lower edge of the first free portion or a lower edge of the second free portion abuts in contact with a lower edge of the nose support portion.

12. The head-mounted device according to claim 10, wherein an upper edge of the nose support portion maintains a space relative to the first free portion and the second free portion, and when the user wears the head-mounted device, the user's nose drives the first free portion and the second free portion to produce displacement and deformation when the overlapping status is adjusted, and the space accommodates the displacement and deformation.

13. The head-mounted device according to claim 10, wherein the head-mounted device further has a pair of gaps located between the nose support portion and the end edge, and the first fixing portion and the second fixing portion extend into the pair of gaps, respectively, and are assembled to the head-mounted device, so that a part of the first free portion and a part of the second free portion close the pair of gaps.

14. The head-mounted device according to claim 10, further comprising a face support portion disposed on the end edge, wherein the nose pad structure further comprises:

a first wing portion extending from the first free portion; and a second wing portion extending from the second free portion, wherein the first wing portion and the second wing portion are respectively disposed on lower surfaces of the face support portion to be abutted between the user's nose wings and the face support portion.

15. The head-mounted device according to claim 10, wherein the nose pad structure further comprises:

a pivot portion for connecting the first free portion and the second free portion, wherein the user's nose contacts and drives the first free portion and the second free portion to rotate with the pivot portion as a center so as to adjust the overlapping status of the first free portion and the second free portion.

16. The head-mounted device according to claim 15, wherein the pivot portion is adjacent to a lower edge of the first free portion and a lower edge of the second free portion, so that an upper edge of the first free portion and an upper edge of the second free portion rotate and displace relative to the pivot portion when the overlapping status is adjusted.

17. The head-mounted device according to claim 14, wherein a part where the face support portion contacts the user's face is in a non-continuous contour, and the nose pad structure connects the non-continuous contour.

* * * * *